Dec. 4, 1934.   T. V. BUCKWALTER   1,982,898
TRUCK FOR LOCOMOTIVES, PASSENGER CARS, AND THE LIKE
Filed Jan. 16, 1933
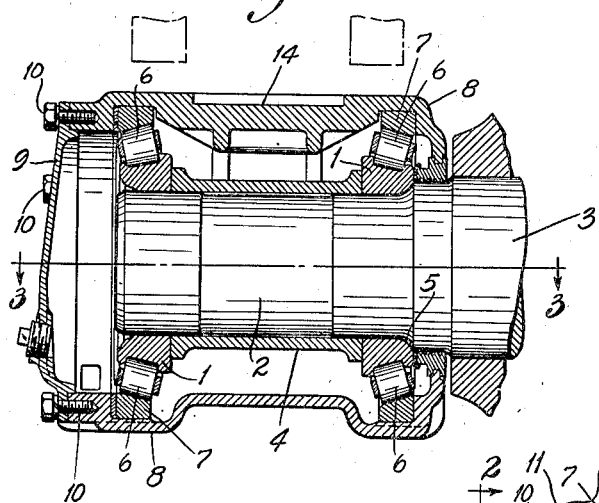
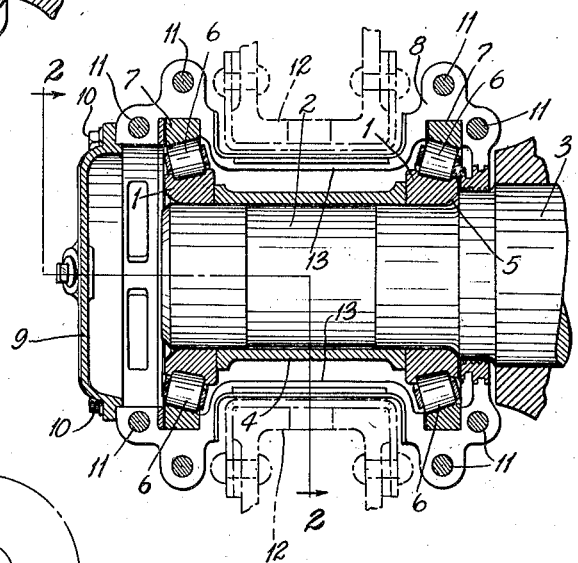
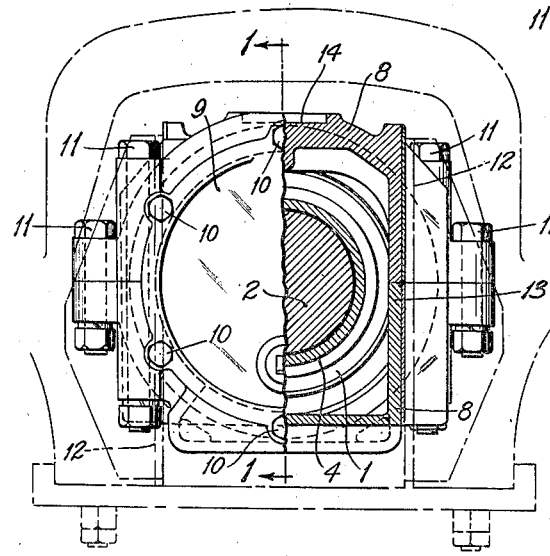
INVENTOR:
Tracy V. Buckwalter
HIS ATTORNEYS Patented Dec. 4, 1934

1,982,898

UNITED STATES PATENT OFFICE 1,982,898

TRUCK FOR LOCOMOTIVES, PASSENGER CARS, AND THE LIKE

Tracy V. Buckwalter, Canton, Ohio, assignor to The Timken Roller Bearing Company, Canton, Ohio, a corporation of Ohio Application January 16, 1933, Serial No. 651,922

5 Claims. (Cl. 105—218)

Trucks of the kind used for locomotives and passenger cars are long-lived constructions which are too expensive to be discarded so long as they are in serviceable condition. At the present time there are a very large number of trucks of this type, almost all of which are equipped with plain bearings; and it is the principal object of the present invention to provide for the replacement of such plain bearings with antifriction bearings and thereby obtain the benefit of greater economy in operation. It is also an object of the invention to make it feasible to replace a broken or defective roller bearing with a standard plain bearing. The invention consists in the parts and in the arrangements and combinations of parts hereinafter described and claimed.

In the accompanying drawing wherein like numerals refer to like parts wherever they occur, Fig. 1 is a view of my construction in vertical section, on the line 1—1 in Fig. 2, Fig. 2 is a view partly in elevation and partly in vertical sect on on the line 2—2 in Fig. 3, and Fig. 3 is a horizontal sectional view on the line 3—3 in Fig. 1.

Figs. 1, 2 and 3 illustrate my invention as applied to a tender truck of standard construction, that is, a truck whose parts and dimensions conform to the standards established by the American Railway Association. According to the present invention, however, the standard plain bearings and the standard journal boxes therefor are replaced with roller bearings and a housing therefor designed and arranged for full cooperation with the other parts of the truck without involving any change of any such parts other than the elimination of the collars on the ends of the standard axle.

According to the present invention, the collar at each end of the standard axle is cut off to permit mounting of the roller bearing. The roller bearing construction comprises two cones 1 or inner raceway members mounted on the journal portion 2 of the standard axle 3 with their large ends toward each other but spaced apart by means of a sleeve 4 on said axle. The inner end of the innermost cone 1 abuts against a shoulder 5 on the axle; and the outermost cone is located at the end of the axle 3. Cooperating with each cone 1 is a circular series of tapered rollers 6 whose outer raceways consist of conical cups 7 mounted in a housing 8 which corresponds in a general way to the journal box of the standard construction. The end of the housing 8 is provided with a closure plate 9 removably secured thereto by cap screws 10. Preferably, the housing 8 is made in halves bolted together by vertical bolts 11 so as to provide for assembly of parts.

In order to permit pedestal jaws 12 of standard dimensions to straddle the housing, it is necessary for the portion 13 of the housing between the two series of rollers 6 to be slightly narrower than the distance between said pedestal jaws; and as the diameter of the roller bearings is necessarily greater than this distance, it is necessary to spread such bearings apart somewhat more than the horizontal width of the pedestal jaws and still keep within the limits determined by the A. R. A. standards. The top of the housing has seats 14 for equalizer systems of any common type, which seats are located within the standard limits.

There are two factors in the present invention that make this feasible: The first factor consists in using taper rollers 6 that are much shorter relative to their diameter than is usual. By adopting this unusual type of roller, that is, a roller whose diameter is about equal to or greater than its length, the raceway members may be made much shorter than in the usual design and therefore their inner raceways 1 can be spread considerably farther apart. This shortening of the rollers requires an increase in thickness thereof and consequently an increase in the diameter of the cups 7 or outer raceway members, which increase can be provided for by enlargement of the housing without conflicting with standard requirements.

The second factor that contributes directly to increasing the distance between the two bearings is that the large ends of the rollers are disposed toward each other. By this arrangement, the over-all space required to accommodate both bearings is the distance between the large ends of the cups 7 or outer raceway members, which distance is substantially the over-all distance from one series of rollers 6 to the other; whereas, with the rollers arranged with their small ends toward each other, the over-all distance required to accommodate such bearings would be the distance between the large ends of the cones, which is greater than the above mentioned distance by the thickness of the two thrust ribs of such cones.

Thus by using short rollers, that is, rollers whose diameter is greater than their length, and arranging them with their large ends towards each other, the portion of the housing between said bearings may be contracted to a sufficient extent and for a sufficient length to permit the pedestal jaws to straddle such portion. Consequently, it is entirely feasible to equip standard trucks of a locomotive or passenger car type with roller bearings without any changes in the retained parts of the truck except only the elimination of the end shoulders of the axles.

It is also noted as an important advantage of the invention that, in case of accidents, or defects or other reasons, it is an easy matter to replace the roller bearings and their housings with standard plain bearings and journal boxes, notwithstanding the removal of the axle shoulders. This is true because at each end of the axle the inward end thrust thereon is resisted by the adjacent shoulder and the outward end thrust is resisted by the shoulder on the opposite end.

What I claim is:

1. A truck for locomotives, passenger cars and the like comprising wheeled axles, frames having pedestal jaws and equalizer systems, the sides of said pedestal jaws being in close proximity to the hubs of said wheels, two series of tapered roller bearings and a housing therefor at each end of the axles, the bearing rollers being shorter than their diameter and the larger ends of the inner raceway members of said bearings facing toward each other, thereby minimizing the distance that the bearing projects towards the wheel end of said housing the portion of the housing between said bearings being longer than the width of the pedestal jaws and narrow enough for said jaws to straddle and the tops of said housings arranged to directly cooperate with said equalizer systems, all the dimensions of said truck being within the limits of similar A. R. A. standard trucks with plain bearings.

2. A truck for locomotives, passenger cars and the like comprising wheeled axles, frames having pedestal jaws, two series of tapered roller bearings and a housing therefor at each end of the axles, the larger ends of the inner raceway members of said bearings facing toward each other with a spacing sleeve between them, the portion of the housing between said bearings being longer than the width of the pedestal jaws and narrow enough for said jaws to straddle, said housing having an annular channel near its inner end adapted to receive the outer raceway member of a bearing and an annular channel near its outer end adapted to receive the outer raceway member of a bearing together with an adjusting shim therefor, said housing comprising two mating sections separable on the diameter.

3. A truck for locomotives, passenger cars and the like comprising wheeled axles, side frames having pedestal jaws and equalizer systems, two series of tapered roller bearings and a housing therefor at each end of the axles, the larger ends of the inner raceway members of said bearings facing toward each other with a spacing sleeve between them and the rollers being shorter than their diameter, the portion of the housing between said bearings being longer than the width of the pedestal jaws and narrow enough for said jaws to straddle and the top of the housing being adapted to accommodate the equalizer systems, all the dimensions of said truck being within the limits of similar A. R. A. standard trucks with plain bearings.

4. An axle bearing construction comprising an axle, a housing for the end thereof having enlarged end portions, two series of tapered roller bearings on said axle and in the enlarged end portions of said housing, the larger ends of the inner raceway members of said bearings facing each other with a spacing sleeve between them, the portion of the housing between enlarged end portions being larger than the width of said frame members and narrow enough for said frame members to straddle and the top of said housing being adapted for cooperation with truck equalizers, said housing having an annular channel near its inner end adapted to receive the outer raceway member of a bearing and an annular channel near its outer end adapted to receive the outer raceway member of a bearing together with an adjusting shim therefor, said housing comprising two mating sections separable on the diameter.

5. A truck for locomotives, passenger cars and the like comprising axles having wheels thereon, frames having pedestal jaws and equalizer systems, the sides of said pedestal jaws being in close proximity to the hubs of said wheels, two series of tapered roller bearings and a housing therefor at each end of each axle, the portion of the housing between said bearings being longer than the width of the pedestal jaws and narrow enough for said jaws to straddle and the tops of said housings arranged to directly cooperate with said equalizer systems, the inner bearing member of each of said bearings having a thrust rib at its larger end that projects beyond the ends of said rollers and beyond the end of the outer bearing member and the larger ends of the inner bearing members facing toward each other thereby minimizing the length of the end portions of said housing by permitting the ribbed ends of said bearing members to be accommodated by the narrowing portions of said housing between the ends thereof and the reduced portion straddled by said pedestal jaws.

TRACY V. BUCKWALTER.